(12) United States Patent
Crameri et al.

(10) Patent No.: US 11,343,621 B2
(45) Date of Patent: May 24, 2022

(54) CONTROLLING A VOLUME DYNAMIC OF A HEARING DEVICE

(71) Applicant: SONOVA AG, Staefa (CH)

(72) Inventors: Erich Crameri, Zürich (CH); Marius Beuchert, Waedenswil (CH); Nicola Hildebrand, Uster (CH)

(73) Assignee: Sonova AG, Staefa (CH)

( * ) Notice: Subject to any disclaimer, the term of this patent is extended or adjusted under 35 U.S.C. 154(b) by 0 days.

(21) Appl. No.: 16/997,721

(22) Filed: Aug. 19, 2020

(65) Prior Publication Data
US 2021/0058714 A1 Feb. 25, 2021

(30) Foreign Application Priority Data
Aug. 22, 2019 (EP) ..................................... 19193012

(51) Int. Cl.
*H04R 25/00* (2006.01)
*G06F 3/16* (2006.01)

(52) U.S. Cl.
CPC ........... *H04R 25/505* (2013.01); *G06F 3/165* (2013.01); *H04R 25/554* (2013.01); *H04R 2225/61* (2013.01)

(58) Field of Classification Search
USPC .......... 381/23.1, 101, 104, 312, 321
See application file for complete search history.

(56) References Cited

U.S. PATENT DOCUMENTS

| 5,903,655 | A | 5/1999 | Salmi et al. |
| 6,175,635 | B1 | 1/2001 | Meyer et al. |
| 6,826,286 | B1 | 11/2004 | Arndt et al. |
| 8,379,870 | B2 * | 2/2013 | Nicolino, Jr. ........ G08B 15/002 381/56 |
| 2004/0190731 | A1 * | 9/2004 | Luo .......................... H04R 3/02 381/93 |

FOREIGN PATENT DOCUMENTS

| EP | 1802171 | 6/2007 |
| JP | H05300595 | 11/1993 |
| JP | 2000013897 | 1/2000 |
| WO | 1999004487 | 1/1999 |

* cited by examiner

*Primary Examiner* — Yosef K Laekemariam
(74) *Attorney, Agent, or Firm* — ALG Intellectual Property, LLC

(57) ABSTRACT

A method includes receiving a volume modifier value; when the volume modifier value is in a soft sound emphasizer range, modifying a volume control curve by increasing a value of the volume control curve in a range below a reference value, the volume control curve defining how much a sound signal with a specific volume is amplified to a desired volume; when the volume modifier value is in a loud sound limiter range, modifying the volume control curve by increasing a value of the volume control curve in a range above a reference value; and applying the modified volume control curve to a sound processor of a hearing device, such that a sound signal processed by the hearing device and output by the hearing device to the user is amplified according to the modified volume control curve.

14 Claims, 3 Drawing Sheets

CONTROLLING A VOLUME DYNAMIC OF A HEARING DEVICE

RELATED APPLICATIONS

The present application claims priority to EP Patent Application No. 19193012.2, filed Aug. 22, 2019, the contents of which are hereby incorporated by reference in their entirety.

BACKGROUND INFORMATION

Hearing devices are generally small and complex devices. Hearing devices can include a processor, microphone, speaker, memory, housing, and other electronical and mechanical components. Some example hearing devices are Behind-The-Ear (BTE), Receiver-In-Canal (RIC), In-The-Ear (ITE), Completely-In-Canal (CIC), and Invisible-In-The-Canal (IIC) devices. A user can prefer one of these hearing devices compared to another device based on hearing loss, aesthetic preferences, lifestyle needs, and budget.

A hearing device often has functions (or so called modifiers) for manually adjusting the sound output of the hearing device. For example, the overall volume, treble and bass may be adjusted by standard modifiers. Special type of modifiers are dynamic volume modifiers, which amplify only specific volume ranges. For example, soft sound modifiers may amplify soft sounds and/or may attenuate loud sounds. Vice versa, loud sound modifiers may amplify loud sounds and/or may attenuate soft sounds.

Users of a hearing device more often report that soft sounds are too soft, but not so often report that soft sounds are too loud. In the contrary, users more often report that loud sounds are too loud but less often that loud sounds are too soft.

BRIEF DESCRIPTION OF THE DRAWINGS

Below, embodiments of the present invention are described in more detail with reference to the attached drawings.

The reference symbols used in the drawings, and their meanings, are listed in summary form in the list of reference symbols. In principle, identical parts are provided with the same reference symbols in the figures.

DETAILED DESCRIPTION

Figure 1:
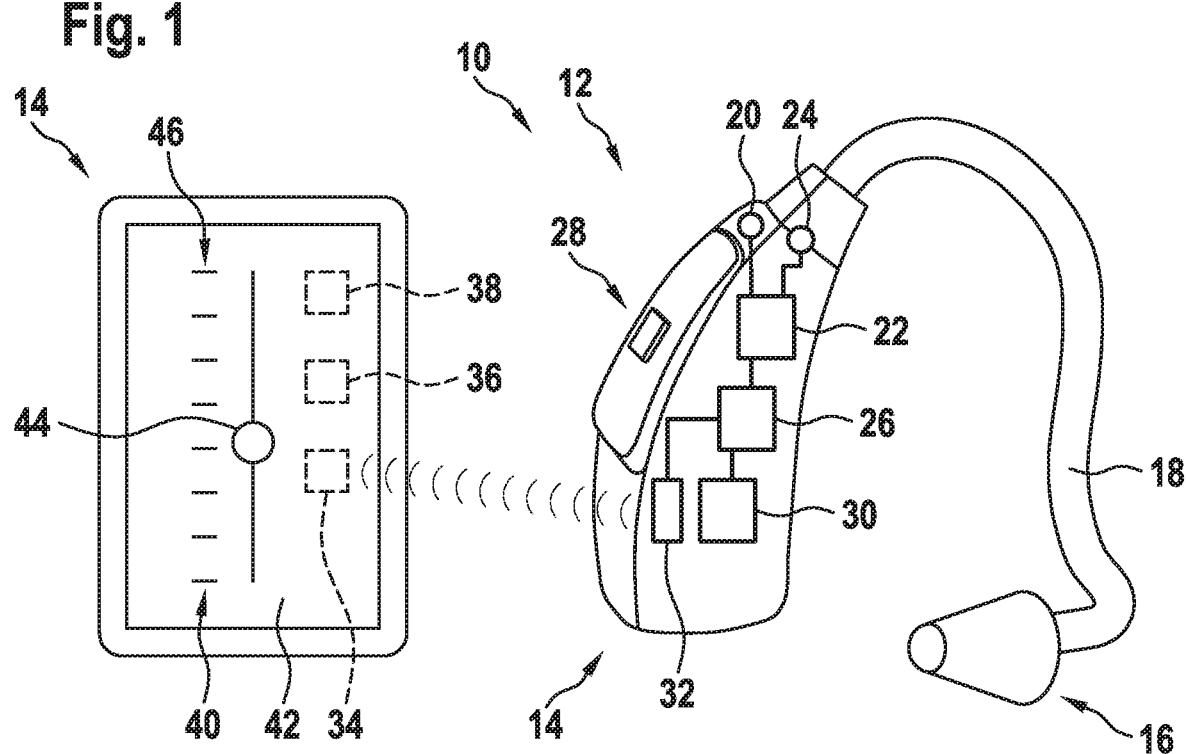
FIG. 1 schematically shows a hearing system according to an embodiment.

Described herein are a method, a computer program and a computer-readable medium for controlling a volume dynamic of a hearing device. Furthermore, described herein is a hearing system with a hearing device.

An aspect described herein is to simplify the volume control of a hearing device.

This aspect is achieved by the subject-matter of the independent claims. Further exemplary embodiments are evident from the dependent claims and the following description.

A first aspect relates to a method for controlling a volume dynamic of a hearing device. A hearing device may be a device as described above. A hearing device may be a hearing aid adapted for compensating the hearing loss of a user.

A hearing device may comprise a microphone, a sound processor and a sound output device, such as a loudspeaker. The sound processor may receive a sound signal from the microphone and may frequency dependent amplify and/or attenuate the sound signal. The sound signal then may be output by the sound output device, such as a loudspeaker, to the ear of the user.

The term "volume dynamic" may refer to a volume dependent volume amplification. In other words, sound of a specific volume may be amplified with a specific volume dependent factor and/or may be amplified to another volume. For example, soft sounds may be amplified differently than loud sounds. In general, the volume of a sound signal may be indicated in dB (decibel).

The method as described herein may be performed automatically by the hearing device and optionally a mobile device in data communication with the hearing device.

According to an embodiment, the method comprises: receiving a volume modifier value, the volume modifier value being selected from a volume modifier range of volume modifier values between a first value and a second value, the volume modifier range being divided in a soft sound emphasizer range between the first value and a neutral value and a loud sound limiter range between the neutral value and the second value. Usually, the volume modifier value may be selected by a user of the hearing device. For example, the hearing device and/or a mobile device in data communication with the user provides a user interface for selecting the volume modifier value.

The volume modifier value may be selected from a range of integers. For example, the first value may be a negative value, the neutral value may be 0 and the second value may be a positive value. As a specific example, the volume modifier value may be an integer from −5 to 5 and/or the volume modifier range may be the range from −5 to 5. The soft sound emphasizer range may comprise negative numbers and/or integers. The loud sound limiter range may comprise positive numbers and/or integers.

In general, in the soft sound emphasizer range, soft sounds should be amplified and in the loud sound limiter range, loud sounds should be attenuated. In such a way, this two different tasks may be implemented by selecting solely one volume modifier value.

According to an embodiment, the method further comprises: when the volume modifier value is in the soft sound emphasizer range, modifying a volume control curve by increasing a value of the volume control curve in a range below a reference value, the volume control curve defining, how much a sound signal with a specific (input) volume is amplified to a desired (output) volume.

The volume control curve may define a function, which maps a specific (input) volume to another (output) volume. In other words, with the volume control curve, a volume specific amplification of the sound signal may be defined. The volume control curve may be defined by a set of points and the other values of the volume control curve may be determined by interpolation between these points. For example, supporting points for the volume control curve may be defined at a quiet sound value, a soft sound value, a medium sound value and a loud sound value of the input volume.

When the volume modifier value is in the soft sound emphasizer range, i.e. the user wishes to amplify soft sounds and optionally to attenuate loud sounds, one or more values below a reference value are increased. The reference value may be a medium sound value, which may separate soft sounds and loud sounds. For example, the reference value may be between 40 dB and 50 dB.

According to an embodiment, the method further comprises: when the volume modifier value is in the loud sound limiter range, modifying the volume control curve by increasing a value of the volume control curve in a range above a reference value. When the volume modifier value is in the loud sound limiter range, i.e. the user wishes to attenuate loud sounds, one or more values below a reference value are increased. The reference value may be a medium sound value, which may separate soft sounds and loud sounds. For example, the reference value may be between 40 dB and 50 dB.

According to an embodiment, the method further comprises: applying the modified volume control curve to a sound processor of the hearing device, such that a sound signal processed by the hearing device and output by the hearing device to the user is amplified according to the modified volume control curve. The sound processor, which also additionally may frequency dependent amplify the sound signal, which for example may have been acquired with a microphone of the hearing device, may additionally amplify the sound signal as defined by the volume control curve. This may mean that it is determined, how loud the sound signal is and that dependent on this value the volume of the sound signal is set to the volume value as defined by the volume control curve.

According to an embodiment, when the volume modifier value is in the soft sound emphasizer range, values of the volume control curve in a range above the reference value are decreased. It may be that, when soft sound should be amplified, not only the soft sounds are amplified but that load sounds are attenuated.

According to an embodiment, when the volume modifier value is in the loud sound limiter range, values of the volume control curve in a range below the reference value are not modified. On the other hand, when loud sounds should be amplified, the amplification of soft sounds may stay the same, since they are anyway softer than loud sounds.

According to an embodiment, the value in the range below the reference value is increased by adding an offset value times the absolute value of the volume modifier value. It also may be that the value in the range above the reference value is increased by adding an offset value times the absolute value of the volume modifier value. In general, the volume modifier value may be used as factor for multiplication with an offset value. This may apply in the case, when the volume modifier value is positive and/or negative. It has to be noted that the differences between neighboring modifier values may be the same.

According to an embodiment, all values of the volume control curve are increased by an equal offset below the reference value. The amplification of soft sounds may be performed by moving the volume control curve to higher values with a constant offset, which may depend on the volume modifier value.

According to an embodiment, the volume control curve comprises a plateau range of equal values between a soft sound value and a medium sound value, the reference value being greater or equal to the medium sound value. The plateau range may be the range of volumes, where soft sounds are amplified by the highest factor.

According to an embodiment, when the volume modifier value is in the soft sound emphasizer range, the values of the plateau range are equally increased. In other words, a constant offset may be added to all values in the plateau range.

In general, the volume control curve may be defined by linear sections, which are defined by their end points. Between these end points or support points, the volume control curve may be linearly interpolated.

According to an embodiment, the volume control curve comprises a first linear range between a quiet sound value and the soft sound value. It may be that, when the values of the plateau range are increased by an offset, the values of the volume control curve in the first linear range are increased by the same offset. Another possibility would be to shift the value at the soft sound value by the offset and to keep the value at the quiet sound value.

According to an embodiment, the volume control curve comprises a second linear range between the medium sound value and a loud sound value. It may be that, when the values of the plateau range are increased, a slope of the second linear range is decreased, such that volume control curve in the plateau range and the second linear range stays connected.

In general, the volume control curve only may be modified, such that it stays continuous. This may be accomplished by moving the end points of the linear sections, such as the first linear range, the plateau range and the second linear range.

According to an embodiment, when the volume modifier value is in the loud sound limiter range, the values of the volume control curve in the plateau range and the first linear range are not modified. As already mentioned, when loud sounds are amplified, it is not necessary to attenuate soft sounds.

According to an embodiment, when the volume modifier value is in the loud sound limiter range, a slope of the volume control curve in a second linear range above the plateau range is decreased. The decrease of the slope may be proportional to the volume modifier value.

According to an embodiment, the unmodified volume control curve is stored in a memory of the hearing device. For example, the unmodified volume control curve has been fitted to a hearing loss of a user of the hearing device. When the hearing device is adapted to the needs of the user, for example during the fitting, the unmodified volume control curve, i.e. the volume control curve used as basis for the dynamic volume adaption as described herein, is preset in the hearing device.

According to an embodiment, the method further comprises: providing a user interface with a mobile device of the user, wherein the user interface comprises a volume modifier control element changeable by the user for selecting a volume modifier value. A mobile device carried by the user, such as a smartphone or tablet computer, may be in data communication with the hearing device. The mobile device may provide a computer program for adjusting parameters in the hearing device. This computer program may comprise a graphical user interface with a control element, such as a slider, for setting the volume modifier.

When the user has selected a volume modifier value, the selected volume modifier value may be sent from the mobile device to the hearing device. All further method steps described above with respect to receiving the volume modifier value, adjusting the volume control curve, etc., may be performed by the hearing device.

Further aspects described herein relate to a computer program for controlling a volume dynamic of a hearing device, which, when being executed by a processor, is adapted to carry out the steps of the method as described in the above and in the following as well as to a computer-readable medium, in which such a computer program is stored.

For example, the computer program may be executed in a processor of the hearing device, which hearing device, for example, may be carried by the person behind the ear. The computer-readable medium may be a memory of this hearing device. The computer program also may be executed at least partially by a processor of a mobile device and the computer-readable medium may be a memory of the mobile device. It may be that steps of the method are performed by the hearing device and other steps of the method are performed by the mobile device.

In general, a computer-readable medium may be a floppy disk, a hard disk, an USB (Universal Serial Bus) storage device, a RAM (Random Access Memory), a ROM (Read Only Memory), an EPROM (Erasable Programmable Read Only Memory) or a FLASH memory. A computer-readable medium may also be a data communication network, e.g. the Internet, which allows downloading a program code. The computer-readable medium may be a non-transitory or transitory medium.

A further aspect described herein relates to a hearing system adapted for performing the method as described in the above and in the following, which comprises a hearing device and optionally a mobile device providing a user interface for selecting the volume modifier value. The hearing device and/or the mobile device may comprise a processor and a memory, in which the computer program is stored. The hearing device may comprise a microphone for acquiring a sound signal, which is volume dependent adjusted in volume with the method.

It has to be understood that features of the method as described in the above and in the following may be features of the computer program, the computer-readable medium and the hearing system as described in the above and in the following, and vice versa.

These and other aspects described herein will be apparent from and elucidated with reference to the embodiments described hereinafter.

FIG. 1 schematically shows a hearing system 10 with a hearing device 12 in the form of a behind-the-ear device and a mobile device 14. It has to be noted that the hearing device 12 is a specific embodiment and that the method described herein also may be performed by other types of hearing devices, such as in-the-ear devices.

The hearing device 12 comprises a part 15 behind the ear and a part 16 to be put in the ear channel of a user. The part 15 and the part 16 are connected by a tube 18. In the part 15, a microphone 20, a sound processor 22 and a sound output device 24, such as a loudspeaker, are provided. The microphone 20 may acquire environmental sound of the user and may generate a sound signal, the sound processor 22 may amplify the sound signal and the sound output device 24 may generate sound that is guided through the tube 18 and the in-the-ear part 16 into the each channel of the user.

The hearing device 12 may comprise a processor 26, which is adapted for adjusting parameters of the sound processor 22, such that an output volume of the sound signal is adjusted based on an input volume. These parameters may be determined by a computer program run on the processor 26. For example, with a knob 28 of the hearing device 12, a user may select a modifier (such as bass, treble, noise suppression, dynamic volume, etc.) and levels and/or values of these modifiers may be selected, which change the frequency dependent gain and the dynamic volume of the sound processor 22. All these functions may be implemented as computer programs stored in a memory 30 of the hearing device 12, which computer programs may be executed by the processor 22.

The hearing device 12 may comprise a sender/receiver 32 for (for example wireless) data communication with a sender/receiver 34 of the mobile device 14, which may be a smartphone or tablet computer. It is also possible that the above mentioned modifiers and their levels and/or values are adjusted with the mobile device. This may be performed with a computer program run in a processor 36 of the mobile device 14 and stored in a memory 38 of the mobile device 14. The computer program may provide a graphical user interface 40 on a display 42 of the mobile device 14.

In the case of adjusting the dynamic volume, the graphical user interface 40 may comprise a slider 44, which is used for selecting a volume modifier value 46, which is indicated by lines besides the slider 44. The selected volume modifier value 46 may be sent to the hearing device 12. Alternatively or additionally, the user may select the volume modifier value 46 with the hearing device 12 itself, for example via the knob 28.

Based on the volume modifier value 46, the hearing device 12 determines and/or adjusts a volume control curve as described above and below and changes the parameters of the sound processor 22 accordingly.

Figure 2:
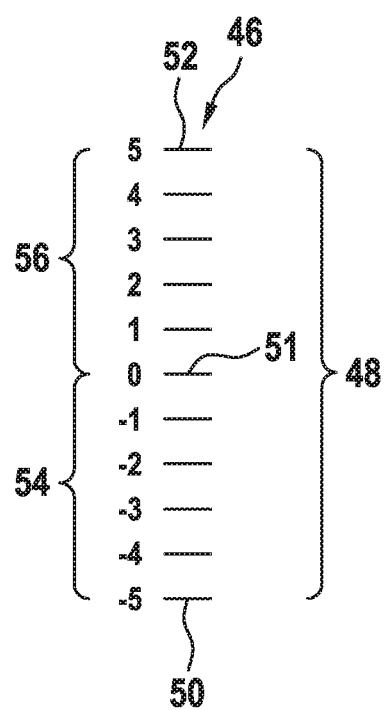
FIG. 2 shows a diagram for explaining a volume modifier value as used in embodiments herein.

FIG. 2 shows an embodiment, how the volume modifier values 46 may be implemented. The volume modifier 46 may be selected from a volume modifier range 48 of volume modifier values between a first value 50 and a second value 52. The volume modifier range 48 may be divided in a soft sound emphasizer range 54 between the first value 50 and a neutral value 51 and a loud sound limiter range 56 between the neutral value 51 and the second value 52. As shown, the volume modifier values 46 may be selected from a discrete set of values, or alternatively may be continuous values. The first value 50 may be a lowest value and the second value may be a highest value. The neutral value 51 may be 0 and/or may be in the middle of the first value 50 and the second value 52.

Figure 3:
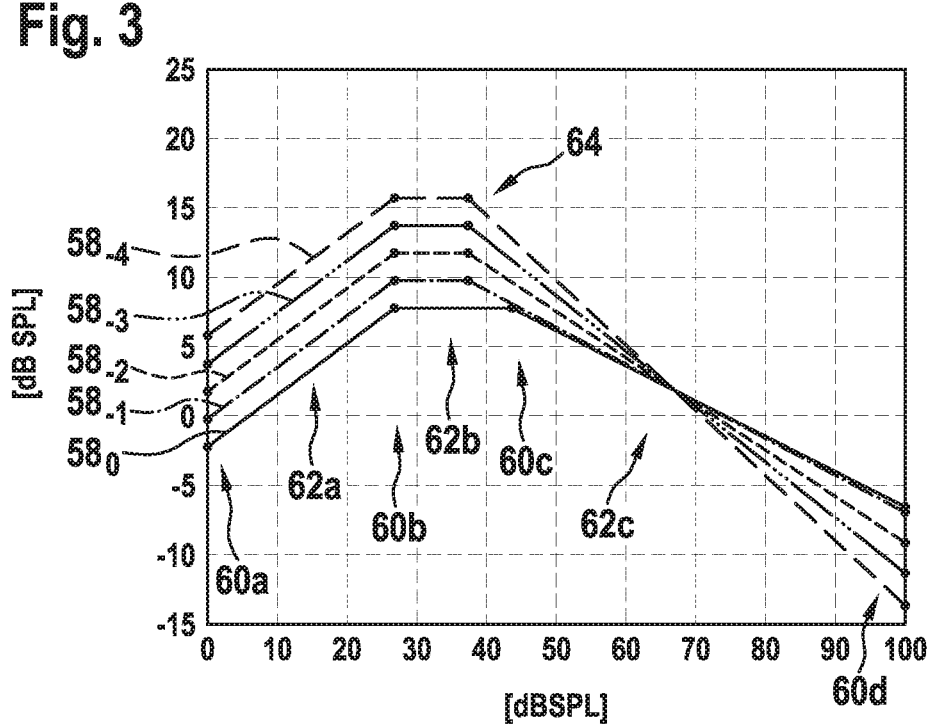
FIG. 3 shows a diagram with volume control curves used in a method according to an embodiment.
Figure 4:
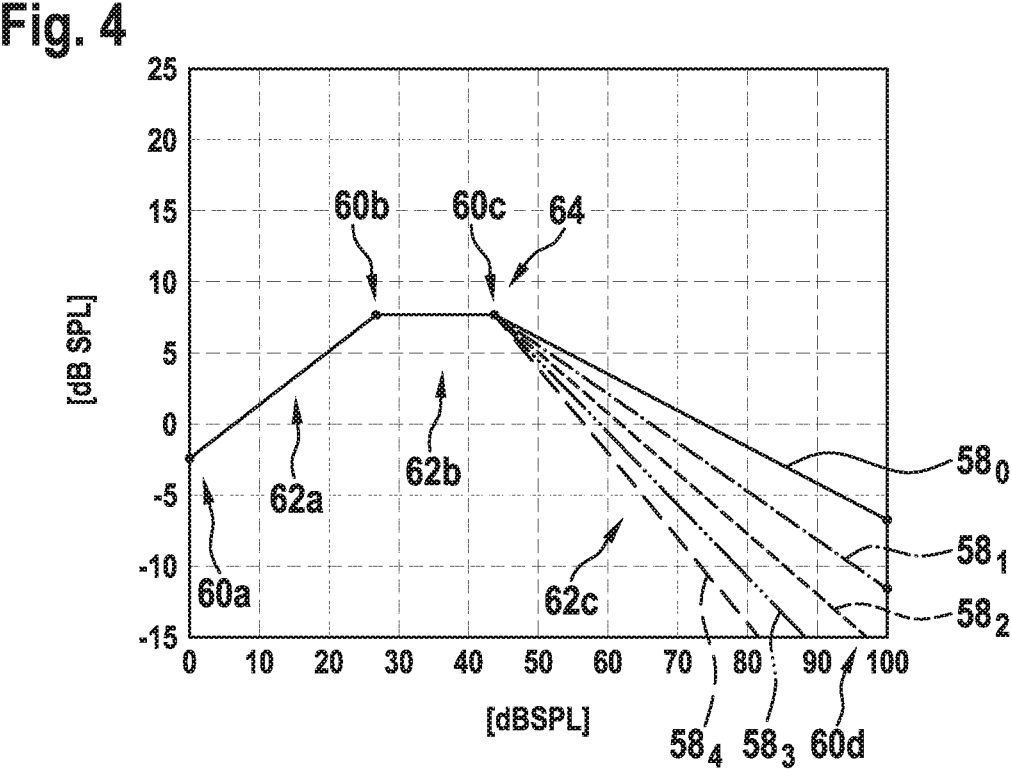
FIG. 4 shows a diagram with volume control curves used in a method according to an embodiment.

FIGS. 3 and 4 show diagrams with volume control curves 58, which are indexed with the corresponding volume modifier value 46.

In the diagrams of FIGS. 3 and 4, the input level of the sound signal in dB SPL (decibel sound pressure level) is depicted from left to right and the desired output level of the processed sound signal is shown in dB SPL from bottom to top.

The volume control curves 58 are defined by four points at a quiet sound value 60a, a soft sound value 60b, a medium sound value 60c and a loud sound value 60d of the input level of the sound signal. The volume control curves 58 comprise a first linear range 62a with positive slope between the quiet sound value 60a and the soft sound value 60b, a plateau range 62b of equal values between the soft sound value 60b and a medium sound value 60c and a second linear range 62c with negative slope between the medium sound value 60c and a loud sound value 60d. Other values of the volume control curves 58 may be determined by linearly interpolating between these points.

The curve 580 is the unmodified volume control curve, which may be implemented in the hearing device 12 during a fitting procedure, when the hearing device 12 is adapted to a hearing loss of the user. The unmodified, fitted volume control curve 580 may be saved in the memory 30 and/or parameters of the sound processor 22 may be set according to the curve 580, when the neutral value 51 for the volume modifier value is selected.

In FIG. 3, the curves 58-4, 58-3, 58-2, 58-1 are the curves, which have been determined from the unmodified curve 580 for the volume modifier values −4, −3, −2, −1, i.e. volume modifier values 46 in the soft sound emphasizer range 54. In this case, values in a range below a reference value 64, which, for example, may be the medium sound value 60c, are increased.

In FIG. 4, the curves 584, 583, 582, 581 are the curves, which have been determined from the unmodified curve 580 for the volume modifier values 4, 3, 2, 1, i.e. volume modifier values 46 in the loud sound limiter range 56. In this case, values in a range above the reference value 64 are decreased.

Figure 5:
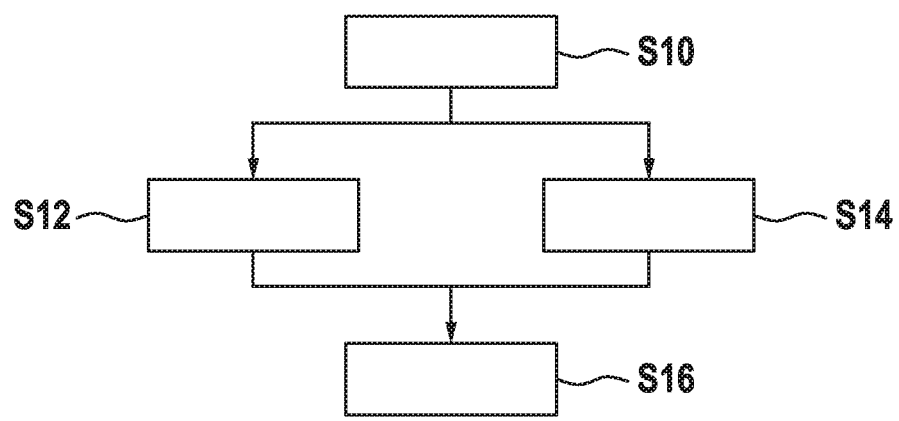
FIG. 5 shows a flow diagram with a method for controlling a volume dynamic of a hearing device according to an embodiment.

FIG. 5 shows a flow diagram for a method for controlling a volume dynamic of the hearing device 12, which may be performed by the hearing system 10.

In step S10, the user interface 40 is provided with the mobile device 14 and the volume modifier control element 42 is shown to the user. The user then may select a new volume modifier value 46. When the user has selected the new volume modifier value 46, the selected volume modifier value 46 is sent from the mobile device 14 to the hearing device 12.

Alternatively, the user may select a new volume modifier value 46 with a user interface of the hearing device 12, such as the knob 28.

In the end, the new volume modifier value 46 is received in a computer program executed in the hearing device 12, which perform the following steps.

Dependent on whether the volume modifier value 46 is in the soft sound emphasizer range 54 or in the loud sound limiter range 56, the method continuous with step S12 or step S14.

In step S12, when the volume modifier value 46 is in the soft sound emphasizer range 54, the volume control curve 58 is modified to emphasize soft sounds. This may be done by increasing output values and/or a range of output values of the volume control curve 58 in an input range below the reference value 64, for example as shown in FIG. 3.

The output values in an input range below the reference value 64 may be increased by adding an offset. The offset may be an offset value times the absolute value of the volume modifier value 46. It also may be that all output values of the volume control curve 58 are increased by an equal offset below the reference value 64. For example, the output values of the plateau range 62b may be equally increased, for example by the offset mentioned above. Also the output values of the volume control curve 58 in the first linear range 62a may be increased by this offset.

As shown in FIG. 3 it is also possible that output values in the second linear range 62b are increased, for example by pivoting the second linear range 62.

Furthermore, output values of the volume control curve 58 in an input range above the reference value 64 may be decreased. For example, when the output values of the plateau range 62b are increased, a slope of the second linear range 62c may be decreased, such that volume control curve 58 in the plateau range 62b and the second linear range 62b stays connected. In this case, the output values below the pivoting point (which in this case may be seen as the reference value) are increased and output values above the pivoting point are decreased.

In step S14, when the volume modifier value 46 is in the loud sound limiter range 56, the volume control curve 58 is modified to limit or decrease loud sounds. This may be done by increasing output values of the volume control curve 58 in an input range above a reference value 64, for example as shown in FIG. 4.

This may be achieved by decreasing a slope of the volume control curve 58 in the second linear range 62c above the plateau range 62b, i.e. in the second linear range 62c. The slope may be proportional to the volume modifier value.

In this case, the output values of the volume control curve 58 in an input range below the reference value 64 are not modified. This input range may comprise the plateau range 62b and the first linear range 62a.

In step S16, the modified volume control curve 58 is applied to the sound processor 22 of the hearing device 12. A sound signal, for example a sound signal acquired by the microphone 20, is processed by the hearing device 12 and is, inter alia, such as frequency dependent amplification, amplified according to the modified volume control curve 58. An input volume of the sound signal is determined and amplified as defined by the modified volume control curve 58. The processed sound signal is then output by the hearing device 12 with the sound output device 24.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art and practicing the claimed invention, from a study of the drawings, the disclosure, and the appended claims. In the claims, the word "comprising" does not exclude other elements or steps, and the indefinite article "a" or "an" does not exclude a plurality. A single processor or controller or other unit may fulfill the functions of several items recited in the claims. The mere fact that certain measures are recited in mutually different dependent claims does not indicate that a combination of these measures cannot be used to advantage. Any reference signs in the claims should not be construed as limiting the scope.

LIST OF REFERENCE SYMBOLS 10 hearing system
12 hearing device
14 mobile device
15 part behind the ear
16 part in the ear
18 tube
20 microphone
22 sound processor
24 sound output device
26 processor
28 knob
30 memory
32 sender/receiver
34 sender/receiver
36 processor
38 memory
40 graphical user interface
42 display
44 slider
46 volume modifier value 48 volume modifier range
50 first value
51 neutral value
52 second value
54 soft sound emphasizer range
56 loud sound limiter range
58 volume control curves
60a quiet sound value
60b soft sound value
60c medium sound value
60d loud sound value
62a first linear range
62b plateau range
62c second linear range
64 reference value

What is claimed is:

1. A method for controlling a volume dynamic of a hearing device, the method comprising:
receiving a volume modifier value, the volume modifier value being selected from a volume modifier range of volume modifier values between a first value and a second value, the volume modifier range being divided in a soft sound emphasizer range between the first value and a neutral value and a loud sound limiter range between the neutral value and the second value;
when the volume modifier value is in the soft sound emphasizer range, modifying a volume control curve by increasing a value of the volume control curve in a range below a reference value and decreasing a value of the volume control curve in a range above the reference value, the volume control curve defining, how much a sound signal with a specific volume is amplified to a desired volume;
when the volume modifier value is in the loud sound limiter range, modifying the volume control curve by increasing a value of the volume control curve in a range above a reference value, wherein values of the volume control curve in a range below the reference value are not modified when the volume modifier value is in the loud sound limiter range; and
applying the modified volume control curve to a sound processor of the hearing device, such that a sound signal processed by the hearing device and output by the hearing device to the user is amplified according to the modified volume control curve.

2. The method of claim 1,
wherein, when the volume modifier value is in the soft sound emphasizer range, values of the volume control curve in a range above the reference value are decreased; and/or
wherein, when the volume modifier value is in the loud sound limiter range, values of the volume control curve in a range below the reference value are not modified.

3. The method of claim 1,
wherein the value in the range below the reference value is increased by adding an offset value times the absolute value of the volume modifier value; and/or
wherein the value in the range above the reference value is increased by adding an offset value times the absolute value of the volume modifier value.

4. The method of claim 1, wherein all values of the volume control curve are increased by an equal offset below the reference value.

5. The method of claim 1,
wherein the volume control curve comprises a plateau range of equal values between a soft sound value and a medium sound value, the reference value being greater or equal to the medium sound value;
wherein, when the volume modifier value is in the soft sound emphasizer range, the values of the plateau range are equally increased.

6. The method of claim 5,
wherein the volume control curve comprises a first linear range between a quiet sound value and the soft sound value;
wherein, when the values of the plateau range are increased by an offset, the values of the volume control curve in the first linear range are increased by the same offset.

7. The method of claim 5,
wherein the volume control curve comprises a second linear range between the medium sound value and a loud sound value;
wherein, when the values of the plateau range are increased, a slope of the second linear range is decreased, such that volume control curve in the plateau range and the second linear range stays connected.

8. The method of claim 5, wherein, when the volume modifier value is in the loud sound limiter range, the values of the volume control curve in the plateau range and the first linear range are not modified.

9. The method of claim 5, wherein, when the volume modifier value is in the loud sound limiter range, a slope of the volume control curve in a second linear range above the plateau range is decreased.

10. The method of claim 1,
wherein the unmodified volume control curve is stored in a memory of the hearing device; and/or
wherein the unmodified volume control curve has been fitted to a hearing loss of a user of the hearing device.

11. The method of claim 1, further comprising:
providing a user interface with a mobile device of the user, wherein the user interface comprises a volume modifier control element changeable by the user for selecting the volume modifier value;
when the user has selected the volume modifier value, sending the selected volume modifier value from the mobile device to the hearing device.

12. A non-transitory computer-readable medium for controlling a volume dynamic of a hearing device, the non-transitory computer-readable medium storing a computer program that, when executed, directs a processor to:
receive a volume modifier value, the volume modifier value being selected from a volume modifier range of volume modifier values between a first value and a second value, the volume modifier range being divided in a soft sound emphasizer range between the first value and a neutral value and a loud sound limiter range between the neutral value and the second value;
when the volume modifier value is in the soft sound emphasizer range, modify a volume control curve by increasing a value of the volume control curve in a range below a reference value and decreasing a value of the volume control curve in a range above the reference value, the volume control curve defining, how much a sound signal with a specific volume is amplified to a desired volume;
when the volume modifier value is in the loud sound limiter range, modify the volume control curve by increasing a value of the volume control curve in a range above a reference value, wherein values of the volume control curve in a range below the reference value are not modified when the volume modifier value is in the loud sound limiter range; and apply the modified volume control curve to a sound processor of the hearing device, such that a sound signal processed by the hearing device and output by the hearing device to the user is amplified according to the modified volume control curve.

13. A hearing system comprising a hearing device, wherein the hearing system is adapted to:

receive a volume modifier value, the volume modifier value being selected from a volume modifier range of volume modifier values between a first value and a second value, the volume modifier range being divided in a soft sound emphasizer range between the first value and a neutral value and a loud sound limiter range between the neutral value and the second value;

when the volume modifier value is in the soft sound emphasizer range, modify a volume control curve by increasing a value of the volume control curve in a range below a reference value, the volume control curve defining, how much a sound signal with a specific volume is amplified to a desired volume;

when the volume modifier value is in the loud sound limiter range, modify the volume control curve by increasing a value of the volume control curve in a range above a reference value, wherein values of the volume control curve in a range below the reference value are not modified when the volume modifier value is in the loud sound limiter range; and apply the modified volume control curve to a sound processor of the hearing device, such that a sound signal processed by the hearing device and output by the hearing device to the user is amplified according to the modified volume control curve.

14. The hearing system of claim 13, wherein the hearing system further comprises a mobile device providing a user interface for selecting the volume modifier value.

* * * * *